(No Model.) 4 Sheets—Sheet 4.
W. J. WILSON.
MACHINE FOR CUTTING GLASS PLATES.
No. 477,585. Patented June 21, 1892.
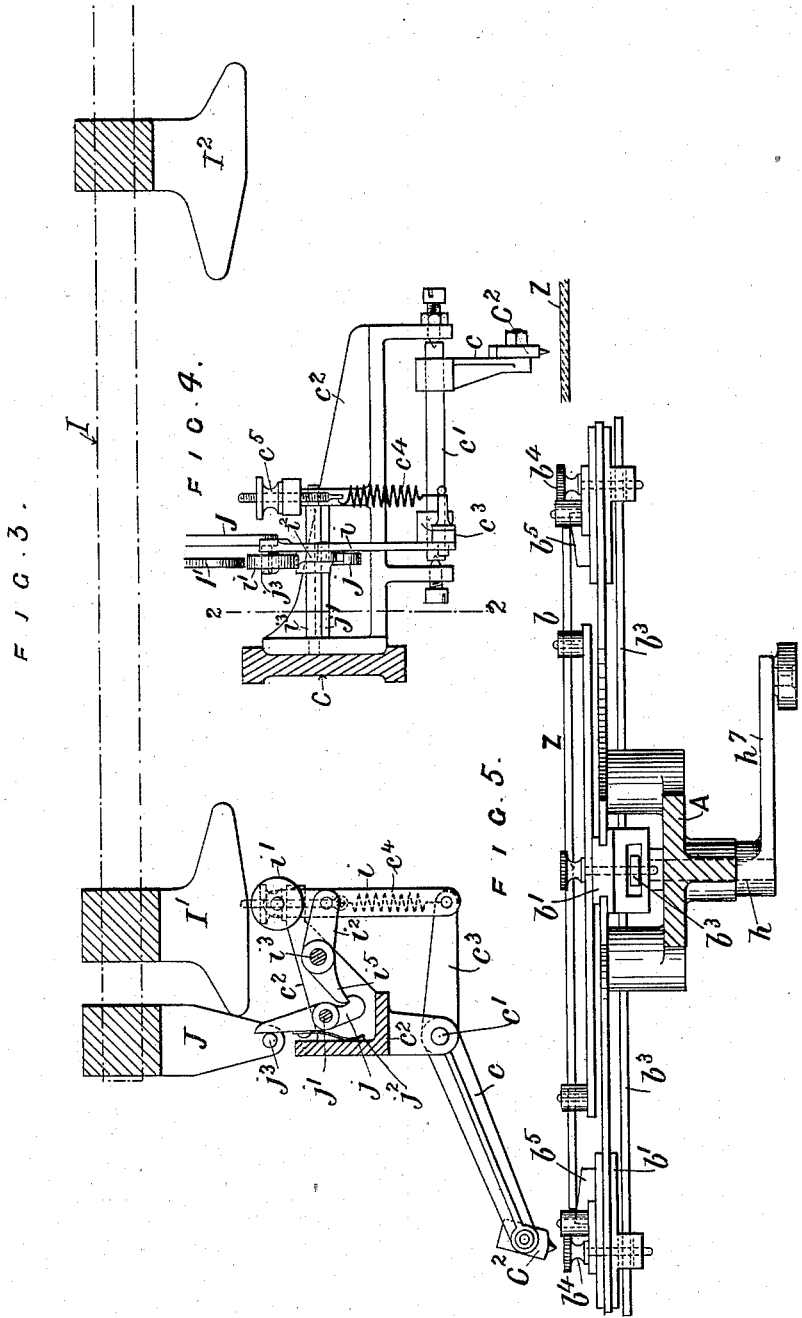

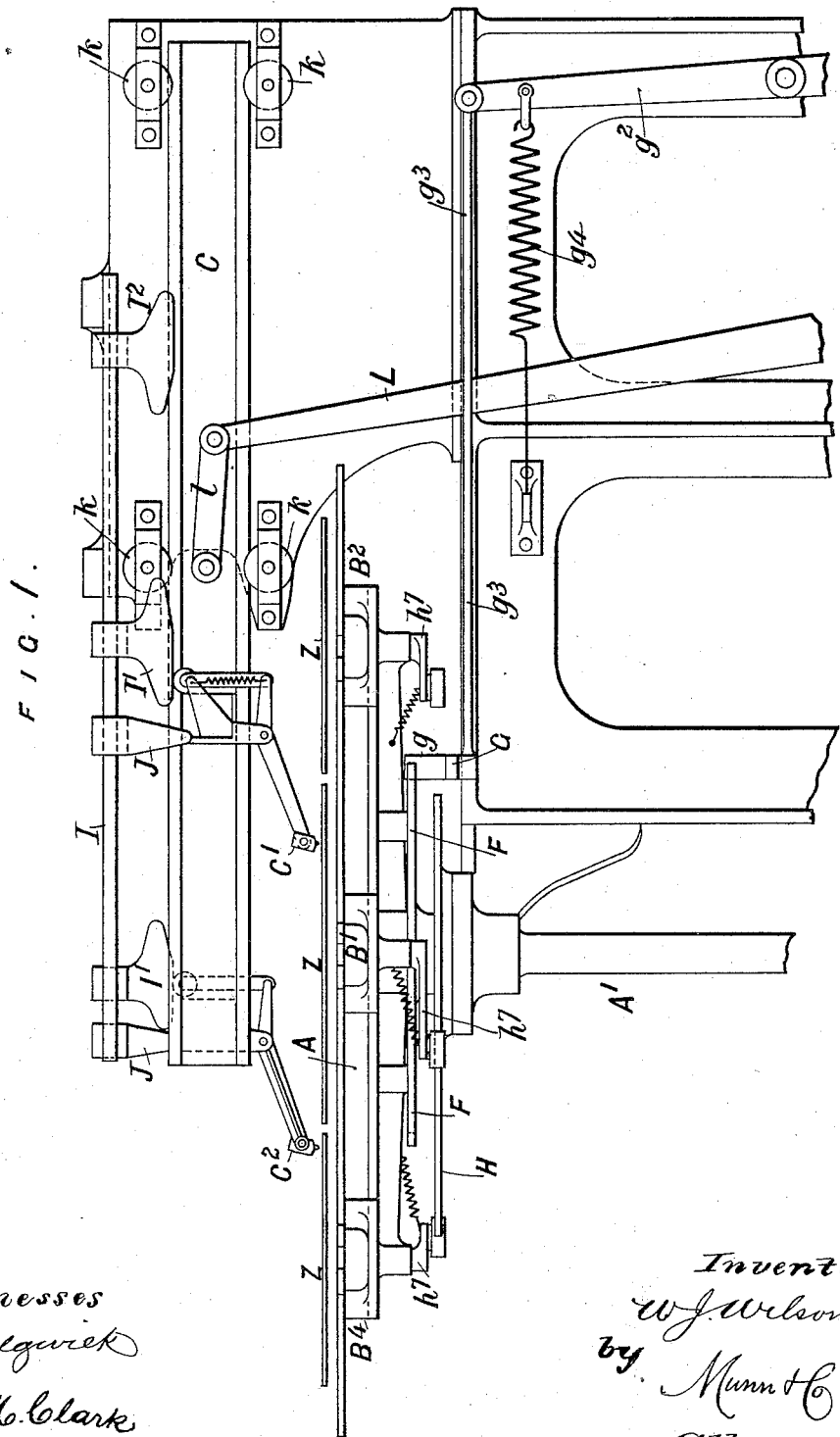

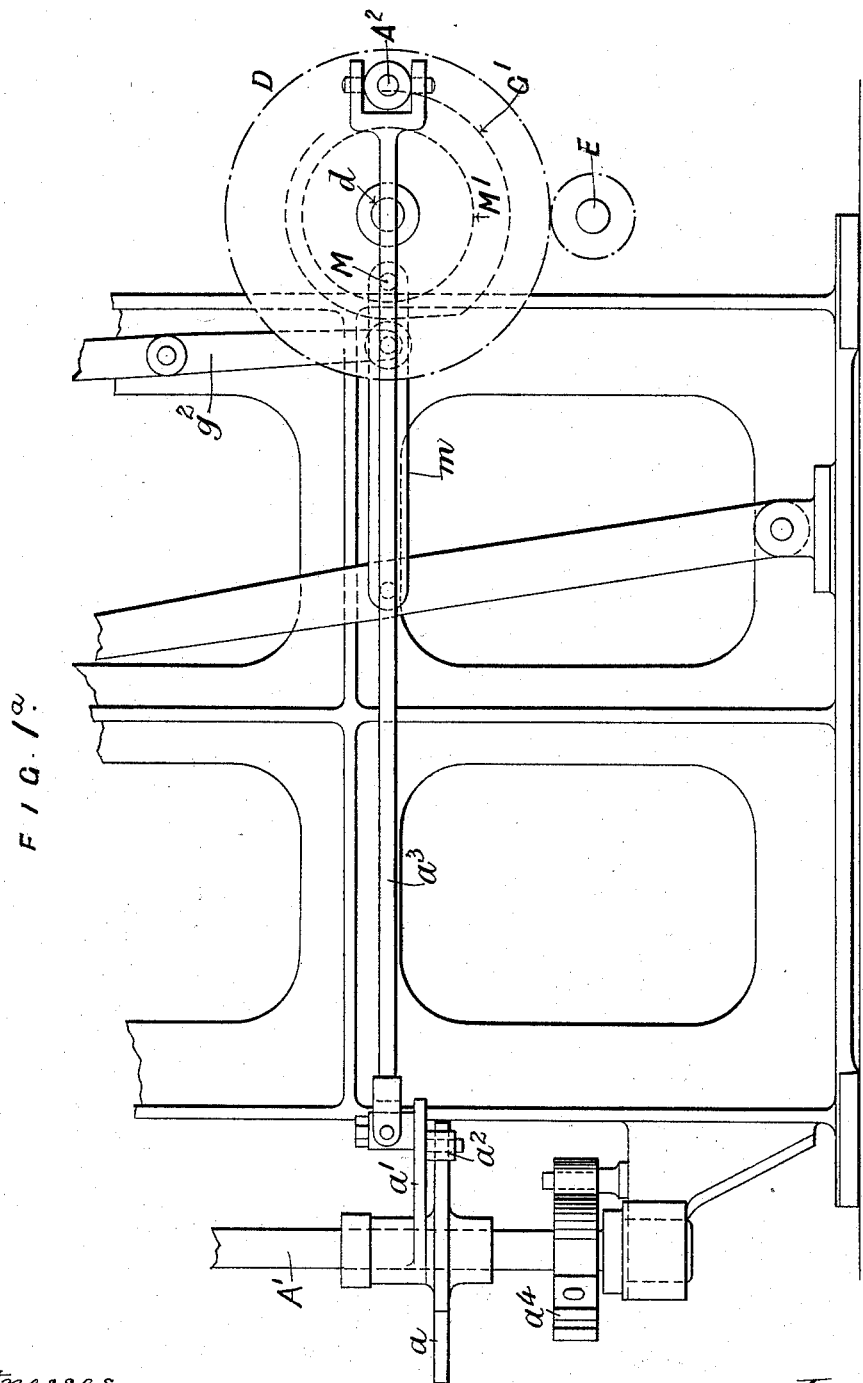

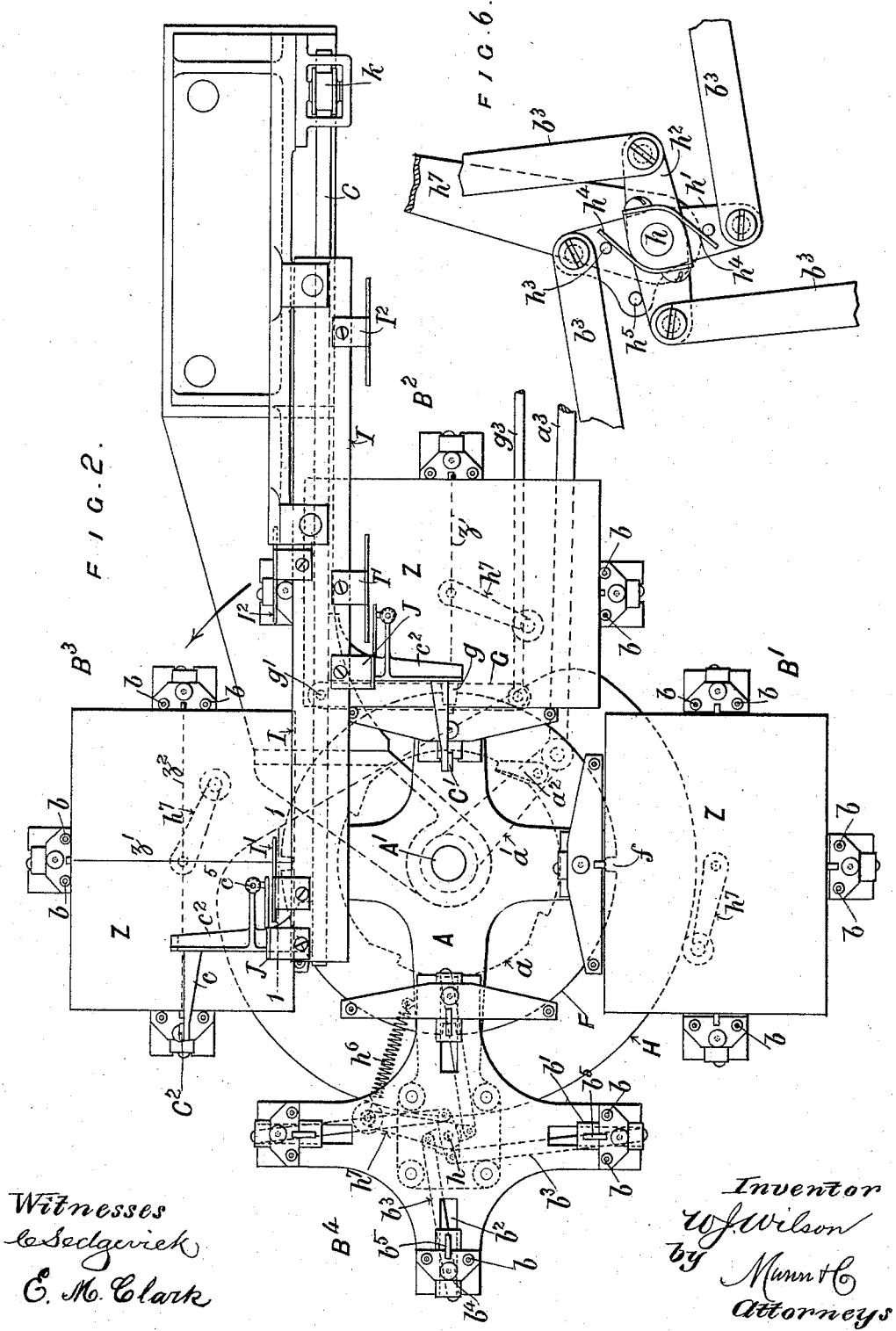

UNITED STATES PATENT OFFICE.

WILLIAM JOHN WILSON, OF WATFORD, ENGLAND.

MACHINE FOR CUTTING GLASS PLATES.

SPECIFICATION forming part of Letters Patent No. 477,585, dated June 21, 1892.

Application filed December 23, 1891. Serial No. 415,951. (No model.)

*To all whom it may concern:*

Be it known that I, WILLIAM JOHN WILSON, chemist, of 6 Malden Road, Watford, in the county of Herts, England, have invented a new and useful Machine for Cutting Glass Plates, of which the following is a full, clear, and exact description.

My invention has for its object the cutting of glass plates by machinery, (particularly photographic plates which have been coated with sensitive emulsion,) whereby the operation of dividing the plates after they have been coated into smaller plates of any of the various standard sizes sold is performed with greater rapidity and precision than can be done by hand, as hitherto.

The invention consists, essentially, of mechanism whereby the plates are held and presented in succession and in proper position to the cutting tool or tools, which are mechanically applied to and removed from the plate at the proper times and wherein the cutting is effected by a relative motion of the plate and cutter, produced either by the movement of the cutter over the plate or by the movement of the plate past the cutter, as will be hereinafter more fully described.

Reference is to be had to the accompanying drawings, forming part of this specification, wherein—

Figures 1 to 6 illustrate a machine adapted to cut each plate into four by two cross-cuts at right angles to one another, Figs. 1 and 1ª being, respectively, side elevations of the upper and lower portions of the machine, and Fig. 2 a part plan of the machine, while the other figures show details drawn to a larger scale, Fig. 3 being a vertical section taken on line 1 1, Fig. 2, and on line 2 2, Fig. 4, illustrating one of the cutter-operating mechanisms, Fig. 4 being an end elevation of the same, Fig. 5 being an elevation of one of the plate-holders in position beneath the cutter-operating mechanism shown in Fig. 3, and Fig. 6 being a detail plan of its gripper-operating mechanism.

The same letters of reference indicate the same parts in all the figures.

In this machine the glass plates to be cut are carried by an intermittently-rotating table, by which they are presented in succession to the action of the cutter, which is traversed across the plate while the latter is at rest, each plate, if it is to be cut across in two directions at right angles to one another, being presented to the action of two cutters in succession, the plate being brought by the partial revolution of its carrier-table in the interval between the action of the first and second cutters to the proper position for the direction of the second cut.

A is the carrier-table fixed on a vertical shaft A' and receiving intermittent rotary motion through successive portions of a revolution with intervening periods of rest.

$B'$ $B^2$ $B^3$ $B^4$ are the frames of the four plate-holders carried by table A. They are all alike and are similarly operated, each comprising four jaws $b$, by which the four edges of the plate Z are gripped. Three plates are shown in position in Fig. 2, one of which has been just placed in its holder B', another of which (contained in holder $B^2$) is about to receive its first cut, (indicated by the dotted line $z'$,) and the third of which (contained in holder $B^3$) is about to receive its second cut (indicated by dotted line $z^2$) at right angles to the cut $z'$, which was made at the previous stroke of the machine. The holder $B^4$ is vacant, the plate having been removed therefrom after having been cut, as described.

$C'$ $C^2$ are the two cutters receiving reciprocating motion on parallel lines, both being mounted on a horizontally-sliding bar C in position to operate on the plates which for the time being occupy the positions $B^2$ and $B^3$ in Fig. 2, the plate in passing from the one position to the other being carried by the rotation of table A in the direction of the arrow through an arc of ninety degrees, so that although the cutters work on parallel lines their cuts will be at right angles to one another on the plate, as denoted by the lines $z'$ $z^2$. It will thus be seen that at the next quarter-revolution of the table A the plate in holder B' will be brought into position to be cut by cutter C', while the plate in holder $B^2$ will be brought into position to be cut by cutter $C^2$, and the plate in $B^3$ will be brought into position to be removed, the vacant holder $B^4$ being at same time brought into position to receive a fresh plate, and so on continuously.

Having explained the general operation of the machine, I will now describe it in detail.

The table-shaft A' is driven by a ratchet propelment from a crank-pin A², said propelment consisting of a ratchet-disk $a$, keyed on A', a lever-arm $a'$, carrying a spring-pressed pawl $a^2$, engaging with $a$, the arm $a'$ being loose on A' and connected by rod $a^3$ with crank-pin A², which is carried by tooth-wheel D, gearing with a pinion on the driving-shaft E. The table A is held stationary during the action of the cutters by a notched disk F, keyed on shaft A', whose notches $f$ correspond to the several plate-holders and in one of which engages a rib $g$ on a locking-lever G, pivoted at $g'$ to the frame and actuated by a cam G' on the shaft $d$ of wheel D through a lever $g^2$ and rod $g^3$, the locking-lever G being engaged with disk F by a spring $g^4$ and disengaged by the cam G'. In order that the table shall not overrun the pawl $a^2$ as it approaches its position of rest, a brake $a^4$ is provided, the said brake gripping a pulley on the shaft, so as to prevent it from rotating too freely.

Each plate-holder comprises four gripper-jaws $b$, carried by slide-blocks $b'$, working in radial slots $b^2$ of the plate-holder frame and connected by links $b^3$ with arms upon a central axis $h$, the links $b^3$ having rows of holes, through any one of which the joint-pins $b^4$ may be passed to adapt the jaws to plates of different sizes.

Referring to Fig. 6, it will be seen that the links $b^3$ of two opposite jaws are connected to the opposite ends of a lever $h'$, fast on the vertical axis $h$, while the other two links are connected to the ends of a lever $h^2$, loose on said axis, but connected to $h'$ through the medium of pins $h^3$ and of springs $h^4$, which are fixed to the boss of $h^2$ and bearing against said pins $h^3$, fixed to $h'$, the object of this arrangement being to equalize the pressure of all four gripping-jaws, which are simultaneously operated in the one direction by a spring $h^6$, attached to a fixed point of table A and to an arm $h^7$, fast on axis $h$, and operated in the other direction by a stationary cam-plate H, against which bears a friction-roller carried by the arm $h^7$. $h^5$ is a stop for the lever $h^2$. This cam-plate H is a disk of the form shown in Fig. 2, so as to allow the springs $h^6$ to cause the jaws to grip the plate Z when the plate-holder is in the position of B² and B³, the cam-plate acting on the arms $h^7$ of the holders in the other two positions B⁴ B', so as to force the jaws outward to release the plate which has been cut and permit the insertion of a fresh one. The acting part of each gripper-jaw which comes in contact with the edge of the plate is formed of two rollers $b$, (preferably ivory,) and the part of the jaw on which rests the coated face of the plate (which is placed face downward) is formed of a strip of steel $b^5$, fixed to the slide-block $b'$ and inclined, as shown in Fig. 5, so that only the extreme edges of the plate rest upon these supports $b^5$.

The cutters C' C² are both carried by bar C, and being similarly operated it will be sufficient to describe the operation of C², which is shown in Figs. 3 and 4. The cutter is a diamond mounted in a holder adjustably pivoted to the end of a lever $c$, fixed on a rock-shaft $c'$, pivoted between centers in a bracket-arm $c^2$, fixed to the slide-bar C. To the shaft $c'$ is fixed another arm $c^3$, opposite to $c$, to which is connected a spring $c^4$, whose tension is regulated by a nut and screw $c^5$ for adjusting the pressure of the diamond on the glass plate. To the lever $c^3$ is also connected a thrust-rod $i$, which terminates in a friction-roller $i'$ and is acted on near the opposite ends of the stroke of the cutter by stationary cams I' and I². The thrust-rod $i$ is guided in its vertical motion by a radius-link $i^2$, jointed to it and pivoted at $i^3$ to the bracket-arm $c^2$, said link $i^2$ having a tail-piece $i^5$, adapted to engage with a catch-lever $j$, pivoted at $j'$ to the bracket $c^2$ and pressed by a spring $j^2$ into engagement with $i^5$, as shown. The cams I' I² are carried by a stationary bar I, forming part of the frame and indicated by dotted lines in Fig. 3, and to this bar is also fixed a bracket J, carrying a tappet $j^3$, against which the tail end of the catch-lever $j$ strikes, as shown in Fig. 3, just before the diamond-cutter carrier reaches the extremity of its return stroke. Thus the continued motion of the carrier toward the left in Fig. 3 causes the catch $j$ to release the cutter mechanism, which during said return stroke has been held out of operative position. On the commencement of the forward stroke the roller $i'$ runs on the straight part of cam I', which prevents the cutter coming down on the plate; but on the roller reaching the inclined part of the cam the cutter comes slowly down upon the upper surface of the plate, the parts being so adjusted that the cutting action shall begin at a short distance from the edge of the plate, so as to avoid the cutter catching the edge of the plate and splintering it. By the traverse of the cutter mechanism toward the right of Fig. 3 during this forward stroke the thrust-rod $i$ comes beneath the other cam I², by which the diamond is lifted off the plate just before it reaches the extreme edge of the plate. This cam I² is set rather lower than the cam I', so as to allow the catch-lever $j$ to engage the tail-piece $i^5$ and hold the cutter in its raised position during the return motion of the cutting mechanism toward the left of Fig. 3. The other cutter C' being similarly operated and the parts being indicated by the same reference-letters, the same description applies. The bar C is mounted to run between pairs of grooved guide-rollers $k$, mounted in brackets on the frame, and it receives reciprocating motion through a link $l$, lever L, and link $m$ from a crank-pin M on a disk M', keyed on the shaft $d$. It must, however, be understood that although the arrangement above described is preferred my invention is not limited thereto, and that the relative rectilineal motion of the plates and of the cutters might, although less conveniently, be produced by making the cutters stationary and imparting to the rotary plate-holder table and its appurtenances, and also to the cams and tappets for putting the cutters in and out of operation, a rectilineal to-and-fro motion of translation in the direction of the motion above described in respect of the cutters, such alteration in the working of the machine involving no change of principle, but only structural alterations, which need no special description. It will also be understood that, if desired, each cutter mechanism might have two or more cutter-levers $c$, placed at proper distance apart on shaft $c'$, the two cutters acting simultaneously and making parallel cuts at equal distances from each other and from the edges of the plate Z, which would in that case be divided into nine parts, or into six parts if only one of the cutter mechanisms has two cutters. It will also be understood that the second cutter $C^2$ may be put out of action if it is desired to cut the plates in one direction only.

Having thus described my invention, what I claim as new, and desire to secure by Letters Patent, is—

1. A machine for cutting glass plates, wherein the plates are held and presented in succession to one or more cutters mechanically applied to and removed from the plates at the proper times and wherein the cutting is effected in two directions at right angles to one another by a relative motion of the plate and cutter produced either by the movement of the cutter or of the plate, substantially as herein specified.

2. In a machine for cutting glass plates in two directions at right angles to one another, the combination, with an intermittently-rotating series of plate-holders, of cutter mechanisms receiving reciprocating rectilinear motion, and mechanism whereby the cutters are brought during their motion in one direction (and during the period of rest of the plate-holders) into operative contact with the plates and during their motion in the other direction out of contact with the plates, as described.

3. In the herein-described machine for cutting glass plates in two directions at right angles, the combination, with the rotating plate-holders $B'$ $B^2$ $B^3$ $B^4$, of the locking mechanism, consisting of the notched disk F on the plate-holder shaft $A'$, the lug $g$, and lever G, and the cam $G'$, actuating said lever G at the proper times for holding the plate-holders stationary during the cutting operation, as specified.

4. In the herein-described machine for cutting glass plates in two directions at right angles, the plate-holders, each consisting of a set of radially-movable gripper-jaws operated from a common center by a spring $h^6$, and a stationary cam H, about which the holder revolves, as and for the purpose specified.

5. In the herein-described machine for cutting glass plates, the combination, with the reciprocating cutter bar or carriage C, and with mechanism consisting of the spring-actuated cutter-lever $c$ and its catch mechanism, of the stationary cams $I'$ $I^2$, and tappet $j^3$ for putting the cutter into operative contact with the plate during its forward stroke and out of contact therewith during its return stroke, substantially as described.

The foregoing specification of my machine for cutting glass plates signed by me this 2d day of December, 1891.

WILLIAM JOHN WILSON.

Witnesses:
 T. N. KENNARD,
53 *Chancery Lane, London, Clerk.*
 JOSEPH LAKE,
17 *Gracechurch Street, London, Notary's Clerk.*